US010569429B1

(12) United States Patent  
Dorfman et al.

(10) Patent No.: US 10,569,429 B1  
(45) Date of Patent: *Feb. 25, 2020

(54) SECURED COMPUTER SYSTEM OVER OPTICAL NETWORKS

(71) Applicants: Benjamin Fridel Dorfman, San Francisco, CA (US); Andrew Joel Swindells, Chicago, IL (US)

(72) Inventors: Benjamin Fridel Dorfman, San Francisco, CA (US); Andrew Joel Swindells, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,534

(22) Filed: Oct. 21, 2019

Related U.S. Application Data

(63) Continuation of application No. 16/004,804, filed on Jun. 11, 2018, now Pat. No. 10,471,609.

(51) Int. Cl.
| | |
|---|---|
| *H04L 29/06* | (2006.01) |
| *G06N 3/04* | (2006.01) |
| *B25J 19/00* | (2006.01) |
| *G05D 1/08* | (2006.01) |
| *G06F 21/00* | (2013.01) |

(Continued)

(52) U.S. Cl.
CPC ......... *B25J 19/0012* (2013.01); *B25J 9/0009* (2013.01); *B25J 19/002* (2013.01); *B25J 19/0008* (2013.01); *B62D 57/032* (2013.01); *G05D 1/0891* (2013.01); *G06F 21/00* (2013.01); *G06N 3/04* (2013.01); *H04L 63/029* (2013.01); *H04L 63/0281* (2013.01); *G05B 2219/40298* (2013.01); *G05B 2219/40465* (2013.01); *G06N 3/02* (2013.01)

(58) Field of Classification Search
CPC .... B25J 19/0012; B25J 9/0009; B25J 19/002; G05D 1/0891; G06N 3/04; G06N 3/02; H04L 63/0281; H04L 63/029; G06F 21/00; G05B 2219/40465; G05B 2219/40298

See application file for complete search history.

(56) References Cited

U.S. PATENT DOCUMENTS

| | | | |
|---|---|---|---|
| 8,194,697 B2 * | 6/2012 | Guillot | H04L 12/40032 370/276 |
| 8,799,756 B2 * | 8/2014 | Grosz | G06F 3/1242 715/202 |

(Continued)

*Primary Examiner* — Mohammad A Siddiqi (57) ABSTRACT

New multi-computer architecture allows for the protection of personal computers to reinforce online security. The disclosed system encompasses intermediate lock-computer and unidirectional internal interfaces based on novel principles providing complete security while sending information to world wide web and reliable filtering of unwanted software while receiving information from the Internet and a secure way to send and receive data through public networks utilizing optical signals and LiFi connections. A key physical principle is the physical separation of dataflow from web-connected computer to intermediate lock-computer to the main personal computer and the counter data flow from main computer to lock-computer to web-connected computer. The usage of optical cables are more secure than electrical because the optical cables do not emit any Radio Frequency Energy (RF Energy) which are susceptible to hacking and the use of Light Fidelity (LiFi) which allows for wireless network capabilities without omitting any RF Energy.

6 Claims, 9 Drawing Sheets

(51) Int. Cl.
*B62D 57/032* (2006.01)
*B25J 9/00* (2006.01)
*G06N 3/02* (2006.01)

(56) References Cited

U.S. PATENT DOCUMENTS

| | | | | |
|---|---|---|---|---|
| 9,104,747 | B2* | 8/2015 | Raichelgauz | G06N 5/025 |
| 9,275,277 | B2* | 3/2016 | Onen | G06F 3/017 |
| 9,406,157 | B2* | 8/2016 | Liu | G06T 11/60 |
| 10,471,609 | B2* | 11/2019 | Dorfman | B25J 19/0008 |
| 2002/0049687 | A1* | 4/2002 | Helsper | G06F 11/3447 |
| | | | | 706/45 |
| 2014/0162598 | A1* | 6/2014 | Villa-Real | H04M 1/66 |
| | | | | 455/411 |
| 2016/0261634 | A1* | 9/2016 | Harrison | G06F 21/82 |

\* cited by examiner

SECURED COMPUTER SYSTEM OVER OPTICAL NETWORKS

CROSS-REFERENCE TO RELATED APPLICATIONS

This application is a continuation-in-part application of U.S. patent application Ser. No. 16/004,804, filed Jun. 11, 2018, which claims the benefit of U.S. Provisional Patent Application Ser. No. 62/517,870, filed Jun. 10, 2017, both of which are incorporated herein by reference in their entireties.

FIELD OF THE INVENTION

The present invention generally pertains to security of sensitive personal, business data and the computer software while working with the world-wide web. Specifically, the present invention is aimed at methods, apparatuses and computer architecture providing reliable protection of personal and business computer from spyware and other unwanted software, hackers and any other attacks from internet.

BACKGROUND OF THE INVENTION

Recently, Intel® introduced a hardware-enhanced identity protection solution, named "Authenticate solution", on select 6th and 7th generation Intel® Core™ vPro™ platforms [1]. This Embedded Security Protection delivers customizable multifactor authentication options to fit individual IT policy. Intel® Authenticate solution is designed to verify two or more factors which are captured, encrypted, matched, and stored in the hardware, thus reducing exposure to common software-level attack methods. Using Intel® Active Management Technology (Intel® AMT), the authentication factors may be selected in any combination from: fingerprint, Bluetooth proximity, protected PIN, and location detection. The new hardware-enhanced identity protection solution significantly decreases the risk of stealing and misusing of the user credentials. However, it does not protect against unwanted software embedded into useful software intentionally acquired by a user from Internet. Indeed, the "Authenticate solution" introduces the hardware to enhance security only in the moment of verification, but do not use hardware in active mode during the work online. Even more importantly, the "Authenticate solution" permanently inserts the most sensitive private information into both hardware and software subsystems working online and thus making them the ultimate target of the hackers.

[1] https://www-ssl.intel.com/content/www/us/en/architecture-and-technology/authenticate/intel-aut henticate-is-hardware-enhanced-security.html Wireless connections emit radio frequency energy that causes the data being transmitted across it to become vulnerable, and wired connection like ethernet emit less radio frequency but can still be exploited. Fiber optical data transmission is a way to transmit data without emitting any radio frequency, but when transforming the optical data back to electrical data, the data is then subjected to the vulnerabilities of wired and wireless connections. When fiber optics are used in a household setting the fiber optic is routed into an optical to electrical transducer which then routed into an ethernet cable or a modem. This means that the data transferred emits no radio frequency energy until it reaches the household, this method is not as secure as it could be. Fiber optics have the special quality of being secure from RF hacks, but this layer of security is let down when the data enters the household. The more secure way of transferring data would be to run the fiber optic cable straight to your computer, and only converting the data from optic to electrical as it enters the computer itself.

Objectives of the present invention include novel methods and apparatuses reinforcing security of a personal computer during its interaction with the world-wide web and providing a principally higher safety than the methods known by the prior art while inserting any sensitive private information neither into hardware nor into software subsystems working online.

Another objective of the present invention is a novel architecture of personal computer consistent with the disclosed secured computer system.

Still another objective of the present invention is integration of software and hardware security devices into a united system unconditionally blocking penetration of unwanted software into said system or leaking of the sensitive personal and business data from the system.

Definition of Terms

Lock-computer: intermediate computer of a multi-computers system providing safe data exchange between personal computer and computer interacting with world-wide web. Lock-computer may be temporarily insulated from all external connections, all data having been temporarily stored in a rewritable memory of said lock-computer are completely erased, and said rewritable memory of said lock-computer is configured to be self-reformatted responsive to being completely erased.

Physically unidirectional interface: an interface between two computers of a multi-computers system providing exclusively one direction of data flow from one computer to another computer. Physically unidirectional interface unconditionally blocks the counter data flows due to underlying physical principle of its functional hardware. Typically, physically unidirectional interface between two computers consists of two sequent transducers, the outlet of the first of two said computers includes the first transducer, and the inlet of the second of two said computers includes the second transducer. Similarly, the counter dataflow from the second of two said computers to the first of two said computers provided by physically unidirectional interface with the reversed sequence of the transducers, thus, the direct data flow and the counter dataflow are unconditionally separated.

Linear physically unidirectional interface: Physically unidirectional interface maintaining unidirectional dataflow while preserving the sequence of signals along the line, such as physically unidirectional interface between the main personal computer and said lock computer, wherein said physically unidirectional interface includes a first electrical-to-optical transducer and a second optical-to-electrical transducer, the outlet of said main computer includes the first transducer, and the inlet on said lock-computer includes the second transducer.

Two-dimensional, or 2D, image-based physically unidirectional interface: Physically unidirectional interface maintaining unidirectional dataflow by converting the electronic (electrical) dataflow into sequences of two-dimensional images on display, transferring the images optically to matrix of photo receivers and converting the received 2D images back to the electronic (electrical) dataflow. Typically, said two-dimensional physically unidirectional interface includes an electronic display configured to display a two-dimensional image as an output interface of the one of the interacting computers providing the data input, and the other of said two unidirectional interfaces includes a matrix of photo receivers as an input interface of the other of said interacting computers.

Transputer—safe intellectual interface between a computer and the cyber world comprising Lock-computer and physically unidirectional interfaces between said lock-computer and other computers of the system.

Main computer—central personal computer of multi-computers system or work station storing private and/or secret business data; main computer may interact with other computers of system and with the world wide web exclusively through lock-computer.

Knowledge base computer—computer accumulating and managing potentially useful information, which is not necessarily needed in daily operation of the Main computer; the knowledge base computer especially designated for accumulation and storing of information acquired from internet.

Web-connected computer—computer of a multi-computers system exclusively providing interaction of said system with the world wide web.

SUMMARY OF INVENTION

The present invention comprises apparatuses and methods reinforcing security of a personal computer during its interaction with the world-wide web and allowing a radically higher safety level than it is achieved or may be achieved even in principle by the methods known by the prior art. The key concept of the present invention is a new architecture of personal computers allowing protection from attacks from the world wide web; said new architecture allows and actualizes the combined software and hardware security devices empowered by the basic physical principles underlying certain key hardware devices. Effectively, the disclosed methods and apparatuses provide five levels of computer defense comprising one level known by the prior art and four principally new levels of defense as they are defined in the detailed description of the invention.

More specifically, it is aimed at new architecture of the personal computers and new principles of the internal interfaces providing complete security while sending information to the world wide web and reliable filtering of unwanted software from the inflow of information from the world wide web.

One principle embodiments of the present invention is a multi-computers system, comprising at least two interacting computers interconnected by two physically separated unidirectional interfaces, one of said two unidirectional interfaces being configured to provide a direct dataflow exclusively from a first of said two interacting computers to a second of said two interacting computers, and the other of said two unidirectional interfaces being configured to provide a counter dataflow exclusively from the second of said two interacting computers to the first of said two interacting computers, such that in each of said at least two interconnected computers of said multi-computer system the direct and counter dataflows are unconditionally physically separated.

In the preferable embodiment, said multi-computers system comprises at least four interacting computers, wherein the first of said at least two interacting computers is a main computer, the second of said at least two interacting computers being a web-connected computer, further comprising a knowledge base computer, wherein neither said main computer, nor said lock computer, nor said knowledge base computer can be directly connected to the world wide web, each of said web-connected computer and said main computer being configured such that neither can directly exchange with data with the other, and wherein each of said web-connected computer, said main computer, and said knowledge base computer is configured to interact only through said the intermediate lock-computer.

Another key principle underlying the present invention is physical separation of dataflow "web-connected computer→lock-computer→main computer" and the counter dataflow "main computer→lock-computer→web-connected-computer", wherein said data flow from said web-connected computer through said lock-computer to said main computer is physically unidirectional and said counter data flow from said main computer through said lock-computer to said web-connected-computer is physically unidirectional.

Another key principle underlying the present invention is that said physically unidirectional data flows provided by physically unidirectional interfaces, said physically unidirectional interfaces unconditionally block the counter data flows due to underlying physical principle of functioning of said interfaces as it is clear from the detailed description of the invention.

BRIEF DESCRIPTION OF THE DRAWINGS

101 main computer; 102 display of main computer; 103 web-connected-computer; 104 display of web-connected computer; 105 knowledge base computer; 106 display of knowledge base computer; 107 safe intellectual interface between main computer and world-wide web, comprising lock computer and physically unidirectional interfaces; said safe intellectual interface is referred below as Transputer; 108 lock computer; 109 linear physically unidirectional interface providing dataflow from the main computer to the lock computer; 110 linear physically unidirectional interface providing dataflow from the lock computer to the web-connected computer; 111 is two-dimensional (2D) physically unidirectional interfaces providing dataflow from the lock computer to the main computer; 112 is 2D physically unidirectional interfaces providing dataflow from web-connected computer to lock computer.

201 display providing the data inflow from web-connected computer to lock-computer; 202 the matrix of photo receivers of lock computer; 203 optical system; 204 inlet of lock computer; 205 outlet of lock computer; 206 display providing the data outflow from lock-computer to main computer; 207 the matrix of photo receivers of main computer; 208 optical system; 209 inlet of lock computer; 210 outlet of lock computer; 211 electrical-to-optical transducer; 212 optical-to-electrical transducer; 213 electrical-to-optical transducer; 214 optical-to-electrical transducer.

501 the world wide web; 502 web-connected computer; 503 filtering out unwanted software by conventional security software; 504 and 505 display and matrix of photo receivers of 2D physically unidirectional interfaces providing dataflow from web computer to lock computer; 506 lock computer; 507 and 508 display and matrix of photo receivers of 2D physically unidirectional interfaces providing dataflow from lock computer to main computer; 509 main computer; 510 linear physically unidirectional interfaces providing dataflow from main computer to lock-computer; 511 knowledge base computer 512 linear physically unidirectional interfaces providing dataflow from lock-computer to web-connected computer.

601 linear physical unidirectional interfaces providing dataflow from web computer to lock computer; 602 linear physical unidirectional interfaces providing dataflow from lock computer to main computer.

701 and 702 physically unidirectional electrical-to-acoustic and acoustic-to-electrical interfaces providing dataflow from web computer to lock computer.

801 is an electrical cable. 802 is an optical cable. 803 is a modem. 804 is a computer. 805 is an Optical-to-electrical transducer. 806 is a light beam splitter. 807 is an additional external Lock-computer. 808 is a wireless transmission. 809 is a strong generation of radio wave energy. 810 is a moderate generation of radio wave energy. 811 is a relatively weak generation of radio wave energy. 812 is an optical to electrical transducer which is located within the computer. Diagram A is an example of a typical internet connection which consists of lots of radio frequency energy being emitted and only electrical wires are used. Because of the amount of radio frequency energy given off this system is vulnerable to radio frequency attacks.

Diagram B has the originating input from an optical cable which is then converted to an electrical signal causing the rest of the system to emit radio frequency energy which causes this system to vulnerable as well.

Diagram C shows a system that utilizes a light splitter to send a signal to both the modem and the computer.

Diagram D is a system that blocks data transfer from the light beam splitter to the modem and insteads routes the data straight to the computer only being converted to an electrical signal within the chassis of the computer.

DETAILED DESCRIPTION OF THE INVENTION

The present invention comprises apparatuses and methods reinforcing security of a personal computer during its interaction with the world wide web and allowing a radically higher safety level than it is achieved or may be achieved even in principle by the methods known by the prior art.

A key concept of the present invention is a new architecture of personal computers allowing combined hardware and software protection from attacks from the world wide web, thus reinforcing security while working with Internet to the safety level that is principally not achievable using the software security alone.

More specifically, it is aimed at new architecture of the personal computers and new principles of the internal interfaces providing complete security while sending information to the world wide web and reliable filtering of unwanted software from the inflow of information from the world wide web.

It is essential for the present invention that any digital file may be represented as two-dimensional image or sequences of two-dimensional images displayed on the computer monitor, the data may be further read from said monitor and converted back to the digital file.

Accordingly to the present invention, said computer system is provided with specifically designated security devices, including special software and a built-in security hardware filtering the data inflow from the unwanted software during its representation as two-dimensional image or sequences of two-dimensional images displayed on the computer monitor and conversion back to the digital file.

It is further essential for the present invention that, while the plurality of possible unwanted programs is extremely broad and unpredictably variable, they may be classified into three principal categories differentiated by the methods of introducing into the computer:
- the compact files attached or incorporated in the proper textual, symbolical, acoustical or image files;
- hidden encoded layer in an image;
- hidden codes distributed through the proper textual, symbolical or image files;

Accordingly to the present invention, each of the above indicated three kinds of unwanted software in data inflow from the world wide web filtered out from the useful data by specified methods, hardware and software devices during conversion of said data inflow to two-dimensional image or sequences of two-dimensional images displayed on the computer monitor and conversion of said two-dimensional images back to digital files.

One of principle embodiments of the present invention is a multi-computers system, comprising at least two interacting computers interconnected by two physically separated unidirectional interfaces, one of said two unidirectional interfaces being configured to provide a direct dataflow exclusively from a first of said two interacting computers to a second of said two interacting computers, and the other of said two unidirectional interfaces being configured to provide a counter dataflow exclusively from the second of said two interacting computers to the first of said two interacting computers, such that in each of said at least two interconnected computers of said multi-computer system the direct and counter dataflows are unconditionally physically separated.

Another principle embodiments of the present invention is the multi-computer system, wherein at least one of said two unidirectional interfaces is an electronic display configured to display a two-dimensional image as an output interface of the one of the interacting computers providing the data input, and wherein at least the other of said two unidirectional interfaces includes a matrix of photo receivers as an input interface of the other of said interacting computers.

Still another principle embodiments of the present invention is the multi-computer system further comprising an intermediate lock-computer, wherein any pair of computers of said multi-computer system except said lock-computer is configured to interact only through said intermediate lock-computer.

In the preferable embodiment of said multi-computers system the first of said at least two interacting computers is a main computer, the second of said at least two interacting computers being a web-connected computer, and said multi-computers system further comprises a knowledge base computer, wherein neither said main computer, nor said lock computer, nor said knowledge base computer can be directly connected to the world wide web, each of said web-connected computer and said main computer being configured such that neither can directly exchange with data with the other, and wherein each of said web-connected computer, said main computer, and said knowledge base computer is configured to interact only through said the intermediate lock-computer.

In the preferred embodiment of said multi-computer system, said intermediate lock-computer comprises:
  a core computer;
  said unidirectional interface providing unidirectional data flow from said lock-computer to said main computer;
  said unidirectional interface providing unidirectional data flow from said main computer to said lock-computer;
  said unidirectional interface providing unidirectional data flow from said web-connected computer to said lock-computer;
  said unidirectional interface providing unidirectional data flow from said lock-computer to said web-connected computer.

Accordingly to another embodiment of the multi-computer system of the present invention, said lock-computer comprises:
  a core computer having built-in unchangeable and immutable system software that is not modifiable by any downloaded program and is configured to be updated only by replacement of a tangible hardware component on which the system software is stored;
  said unidirectional interface providing unidirectional data flow from said lock-computer to said main computer and comprising an electronic display configured to display a two-dimensional image as an output interface from said unidirectional interface,
  said unidirectional interface providing unidirectional data flow from said main computer to said lock-computer, said unidirectional interface including a first electrical-to-optical transducer and a second optical-to-electrical transducer, wherein the outlet of said main computer includes the first transducer, and the inlet on said lock-computer includes the second transducer.
  said unidirectional interface providing a unidirectional data flow from said web-connected computer to said lock-computer and vice versa.

Accordingly to still another embodiment of the multi-computer system of the present invention, said lock-computer being configured to, after an end of a session, said lock-computer is temporarily locked from all external connections including connections with said main computer, with said knowledge base and with said web-connected computer, wherein all data having been temporarily stored in a rewritable memory of said lock-computer are completely erased, and said rewritable memory of said lock-computer is configured to be self-reformatted responsive to being completely erased.

In another embodiments of the multi-computer system of the present invention, a ratio between a resolution of said electronic display, $H(1) \times V(1)$, and resolution of said matrix of photo receivers, $H(2) \times V(2)$, satisfies the condition: $H(2) > H(1)$, $V(2) > V(1)$.

While in the disclosed multi-computer system accordingly to [0037] the condition: $H(2) > H(1)$, $V(2) > V(1)$ is generally preferable, the stronger condition $H(2) > 2H(1)$, and $V(2) > 2V(1)$ would provide the higher security level and hence—still more preferable.

Still higher level of security accordingly to the present invention would provide the multi-computer system accordingly to [0037], wherein $V(2)$ and $H(2)$ are prime numbers.

In the other embodiment of the present invention, said multi-computer system further comprises an electrical-to-optical transducer operatively coupled to the electronic display and being configured to automatically convert between an RGB mode and a non-RGB mode including a CMYK mode, an index mode, a grayscale mode, or a bitmap mode for detection by said matrix of photo receivers and conversion by an optical-to-electrical transducer into the data input. Such conversion automatically filters out the hidden layer with unwanted codes and also provides the additional filtering out of the hidden codes distributed through the proper textual, symbolical or image files.

The arrangement of the hardware devices accordingly to [0037-0040] will additionally secure that the hardware of the disclosed system multi-computer system will automatically filters out the hidden codes distributed through the proper textual, symbolical or image files.

Still in other embodiment of the present invention, one of said unidirectional interfaces of said multi-computer system includes a unidirectional electrical-to-acoustic transducer and the other of said unidirectional interfaces includes a unidirectional acoustic-to-electrical transducer.

Figure 1:
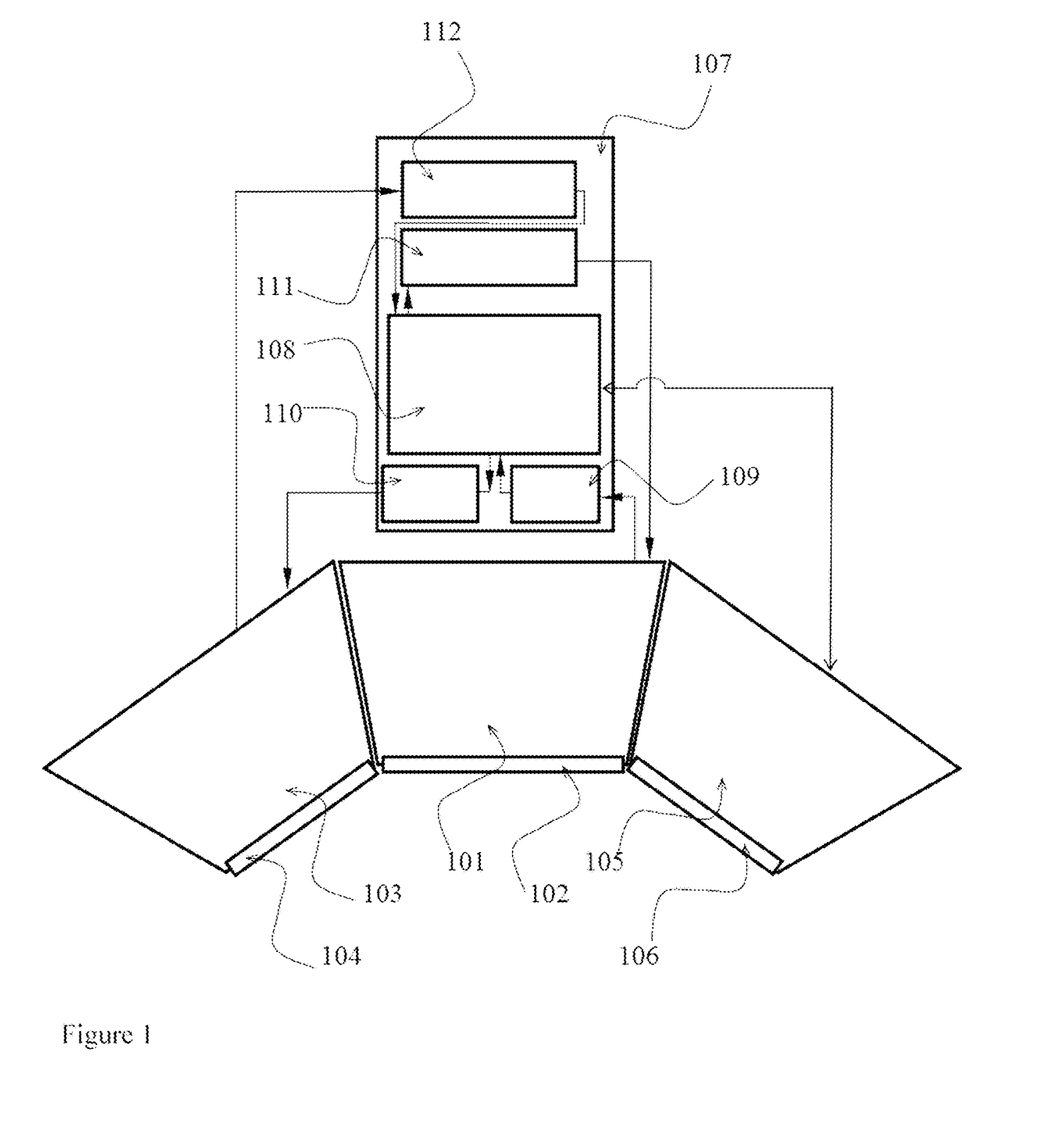
FIG. 1 shows the schematic diagram of the secured computer system in preferred embodiment.

Referring to FIG. 1, it shows the schematic diagram of the secured computer system in the preferred embodiment: 101 main computer; 102 display of main computer; 103 web-connected-computer; 104 display of web-connected-computer; 105 knowledge base computer; 106 display of knowledge base computer; 107 safe intellectual interface between main computer and www, comprising lock computer and physically unidirectional interfaces; said safe intellectual interface is referred below as Transputer; 108 lock computer; 109 linear physically unidirectional interface providing dataflow from main computer to lock computer; 110 linear physically unidirectional interface providing dataflow from lock computer to web-connected computer; 111 is two-dimensional (2D) physically unidirectional interfaces providing dataflow from lock computer to main computer; 112 is 2D physically unidirectional interfaces providing dataflow from web-connected computer to lock computer. The important principle underlying the functionality of the hardware of said multi-computer system accordingly to the present invention is physical separation of data flow from said web-connected computer to said lock-computer to said main computer and the counter data flow from said main computer to said lock-computer to said web-connected computer, wherein said data flow from said web-connected computer through said lock-computer to said main computer is physically unidirectional and said counter data flow from said main computer through said lock-computer to said web-connected computer is physically unidirectional. Said physically unidirectional interfaces unconditionally block the counter data flows due to underlying physical principle of functioning of said interfaces.

Figure 2:
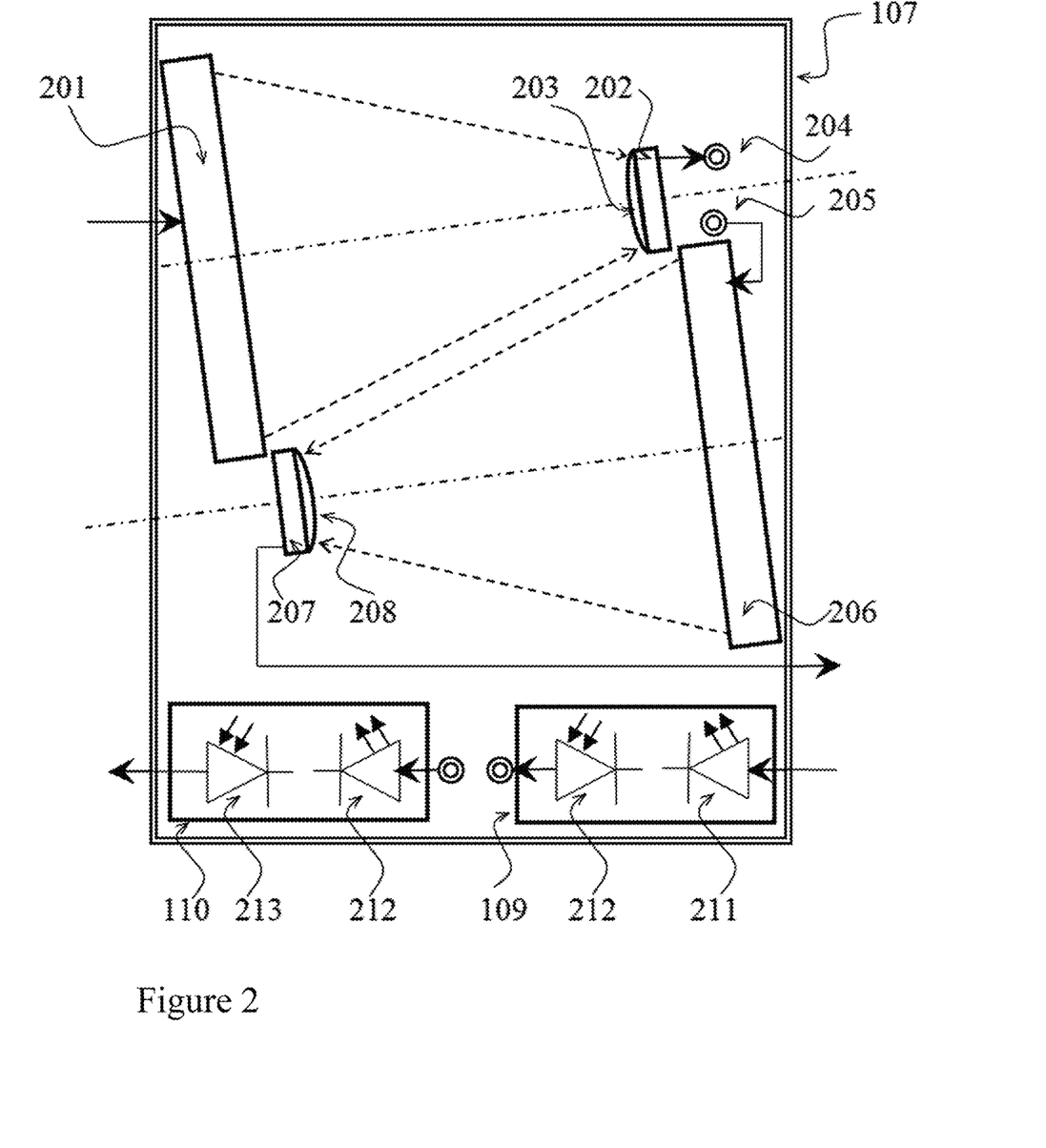
FIG. 2 shows the schematic diagram of two-dimensional physically unidirectional interfaces with remote positions of the matrices of photo receivers versus displays.
Figure 3:
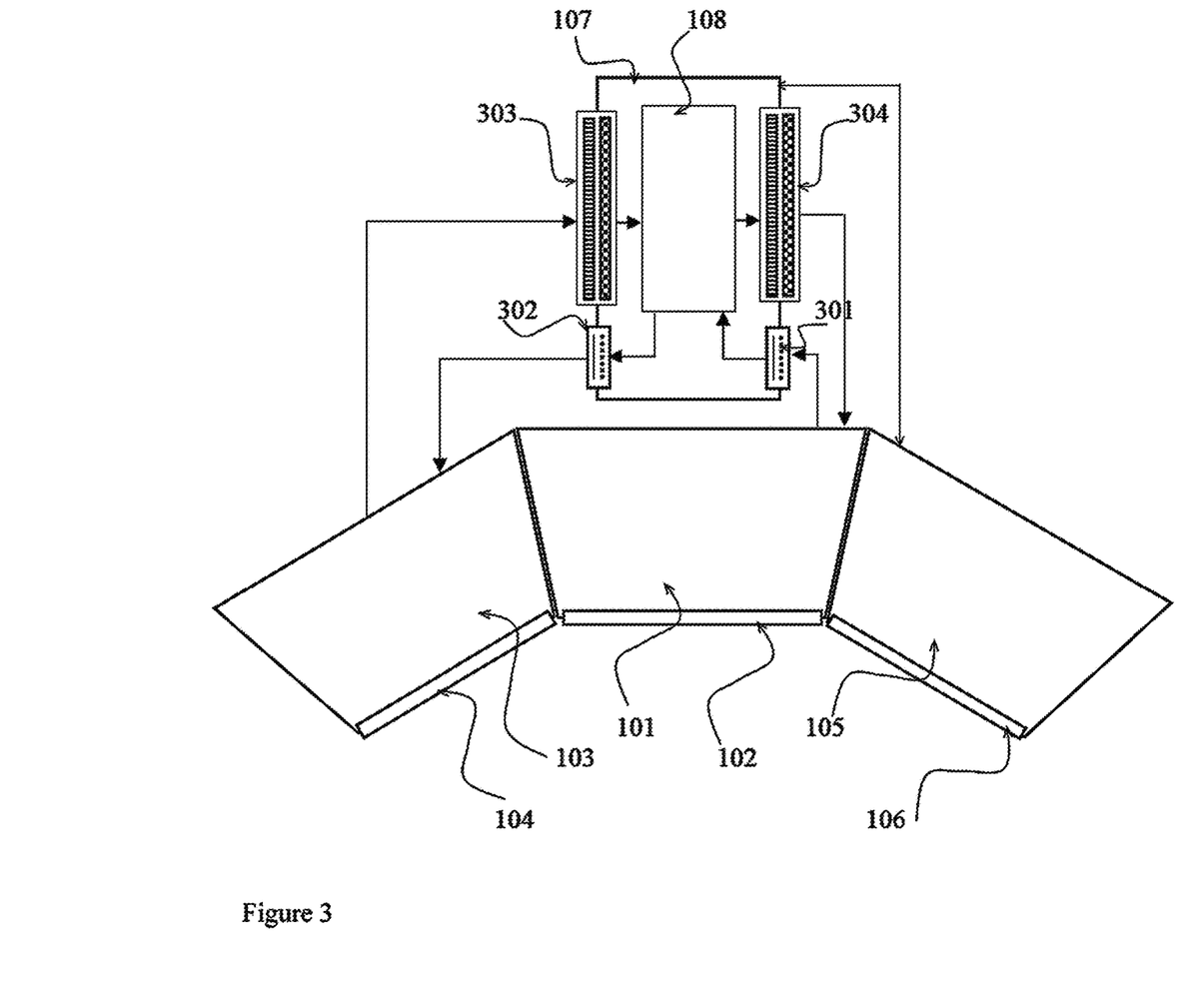
FIG. 3 shows the schematic diagram of the secured computer system in preferred embodiment with two-dimensional, or 2D, image-based 2D physically unidirectional interfaces formed as the compact planar arrays: 301 linear physically unidirectional electrical-to-optical-to-electrical planar interface providing dataflow from main computer to lock computer; 302 linear physically unidirectional electrical-to-optical-to-electrical planar interface providing dataflow from lock computer to web-connected computer: 303 physically unidirectional 2D planar interface providing dataflow from web-connected computer to lock computer; 304 2D physically unidirectional planar interfaces providing dataflow from lock computer to main computer.

FIG. 2 and FIG. 3 are the schematic diagrams showing two possible realizations of secured computer system of the present invention based on the hardware technologies known by the prior art. Although both shown realizations are based on the hardware technologies known in the prior art, their industrial practical implementation may be considered in sequence along the path of progress in the corresponding large-scale industries, namely the realization accordingly to FIG. 2 may be readily implemented correspondingly to the market demand, while the large-scale realization accordingly to FIG. 3 may require a few more years.

Specifically, FIG. 2 shows the schematic diagram of 2D physically unidirectional interfaces with remote positions of the matrices of photo receivers versus displays:

201 display providing the data inflow from web-connected computer to lock-computer; 202 the photo receivers matrix of lock computer; 203 optical system; 204 inlet of lock computer; 205 outlet of lock computer; 206 display providing the data outflow from lock-computer to main computer; 207 the photo receivers matrix of main computer; 208 optical system; 209 inlet of lock computer; 210 outlet of lock computer; 211 electrical-to-optical transducer; 212 optical-to-electrical transducer; 213 electrical-to-optical transducer; 214 optical-to-electrical transducer.

FIG. 3 shows the schematic diagram of the secured computer system in preferred embodiment with two-dimensional, or 2D, image-based 2D physically unidirectional interfaces formed as the compact planar arrays: 301 linear physically unidirectional electrical-to-optical-to-electrical planar interface providing dataflow from main computer to lock computer; 302 linear physically unidirectional electrical-to-optical-to-electrical planar interface providing dataflow from lock computer to web-connected computer: 303 physically unidirectional 2D planar interface providing dataflow from web-connected computer to lock computer; 304 2D physically unidirectional planar interfaces providing dataflow from lock computer to main computer.

In a typical example, said web-connected computer comprises:
1. the core computer with conventional architecture known from the prior art;
2. said outlet providing unidirectional data flow from the web-connected computer to Said lock-computer comprising two-dimensional, or 2D, image-based transducer;
3. said inlet providing unidirectional data flow from Said lock-computer to the web-connected computer;
4. the cable and/or wireless interface with world-wide web.

Said web-connected computer does not maintain any private data of the owner, except the temporal data received from the main computer for the current session. After the end of each session all private data are reliably deleted. In the preferred embodiment, said web-connected computer possesses the full functionality of a common personal computer and may be employed independently for interactive communication with WWW provided with the necessary input information from the Main computer with the immediately following reliable separation from the Main computer as described above.

Also in a typical example, said Main computer comprises:
1. the core computer with conventional architecture known from the prior art;
2. said inlet providing unidirectional data flow from said lock-computer to said main computer, preferably comprising two-dimensional, or 2D, image-based transducer;
3. said outlet providing unidirectional data flow from said main computer to said lock-computer,
4. biosensors and other personal devices.

Figure 4:
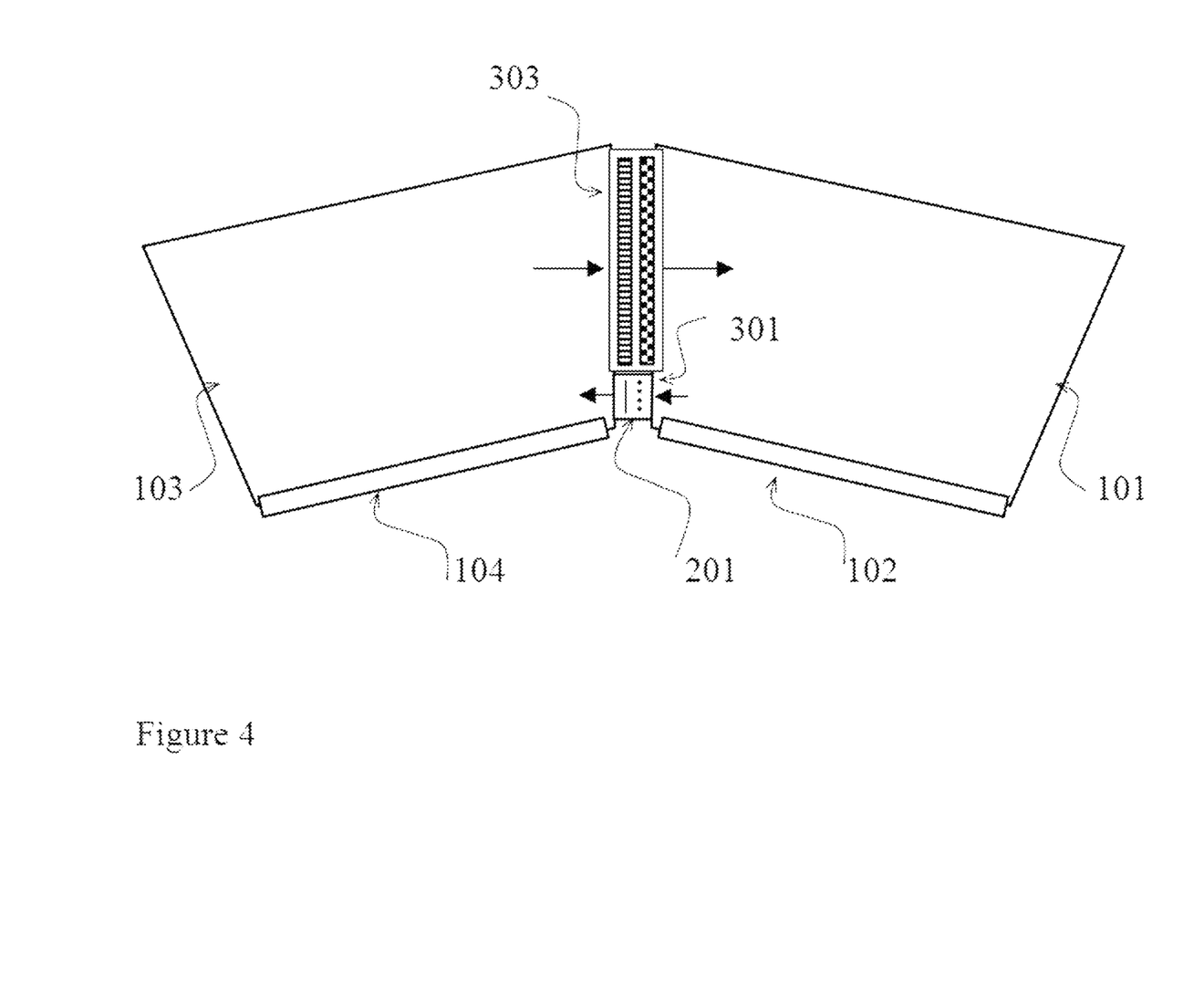
FIG. 4 shows schematic diagram of the secured computer system in the simplified embodiment.

The image-based 2D physically unidirectional interfaces described in the present disclosure would provide the higher security level while working with the world wide web even in a simplified architectural arrangements, such as shown as an example on FIG. 4 schematically the secured computer system in the utmost simplified embodiment.

Figure 5:
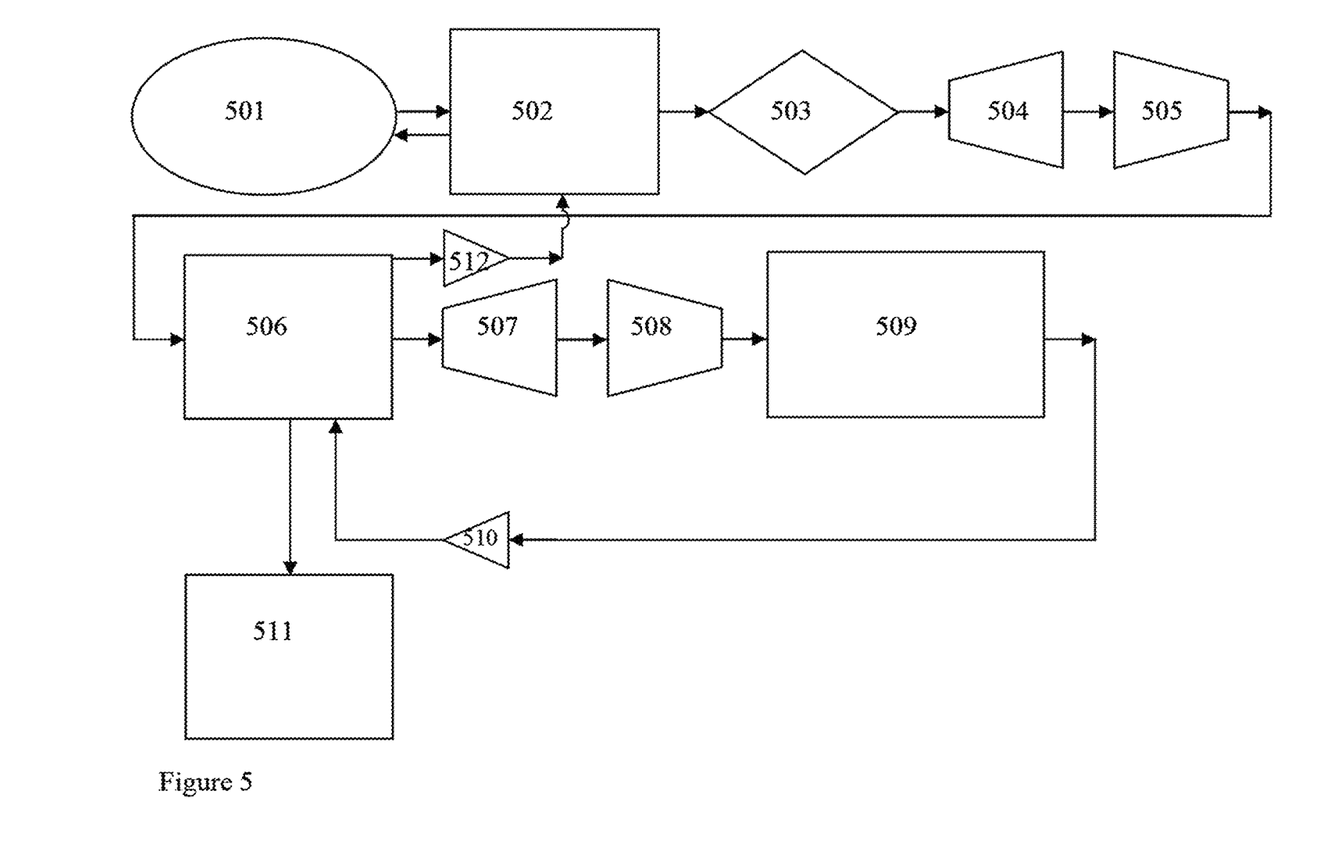
FIG. 5 shows the dataflow chart of the secured computer system.

FIG. 5 shows the basic dataflow chart of the secured computer system: 501 the world wide web; 502 web-connected computer; 503 filtering out unwanted software by conventional security software; 504 and 505 display and matrix of photo receivers of 2D physically unidirectional interfaces providing dataflow from web computer to lock computer; 506 lock computer; 507 and 508 display and matrix of photo receivers of 2D physically unidirectional interfaces providing dataflow from lock computer to main computer; 509 main computer; 510 linear physically unidirectional interfaces providing dataflow from main computer to lock-computer; 511 knowledge base computer 512 linear physically unidirectional interfaces providing dataflow from lock-computer to web-connected computer.

The data flow which is sent from said main computer through said lock-computer to said web computer controlled by two interfaces comprising double transducer each as the following:
1. said physically unidirectional interface providing data flow from said main computer to said lock-computer comprises double transducers wherein the outlet of the main computer comprises only sending transducer, in the preferred embodiment electrical-to-optical transducer, such as the light diodes or laser diodes, and inlet on said lock-computer comprises only receiver, in the preferred embodiment optical-to-electrical transducers, such as the photodiodes.
2. said physically unidirectional interface providing data flow from said lock-computer to said web-connected computer comprises double transducers wherein the outlet of the lock-computer comprises only sending transducer, in the preferred embodiment electrical-to-optical transducer, such as the light diodes or laser diodes, and inlet on said web-connected computer comprises only receiver, in the preferred embodiment optical-to-electrical transducers, such as the photodiodes.

The following specific example, while not limiting the scope of this disclosure, may provide some illustration of its possible technical implementation:
1. said physically unidirectional interface providing data flow from said web-connected computer to said lock-computer comprises two-dimensional, or 2D, image-based transducer, in the preferred embodiment said 2D image-based transducer comprises display as the outlet of said web-connected computer and the matrix of photo receivers, such as matrix of CCD optical sensors, as the inlet of the lock-computer;

2. said physically unidirectional interface providing data flow from said lock-computer to said Main computer comprises two-dimensional, or 2D, image-based transducer, in the preferred embodiment said 2D image-based transducer comprises display as the outlet of said lock-computer and the matrix of photo receivers, such as matrix of CCD optical sensors, as the inlet of the main computer; Such preferred embodiment with the double image-based unidirectional optical interfaces provides the maximal security.

Figure 6:
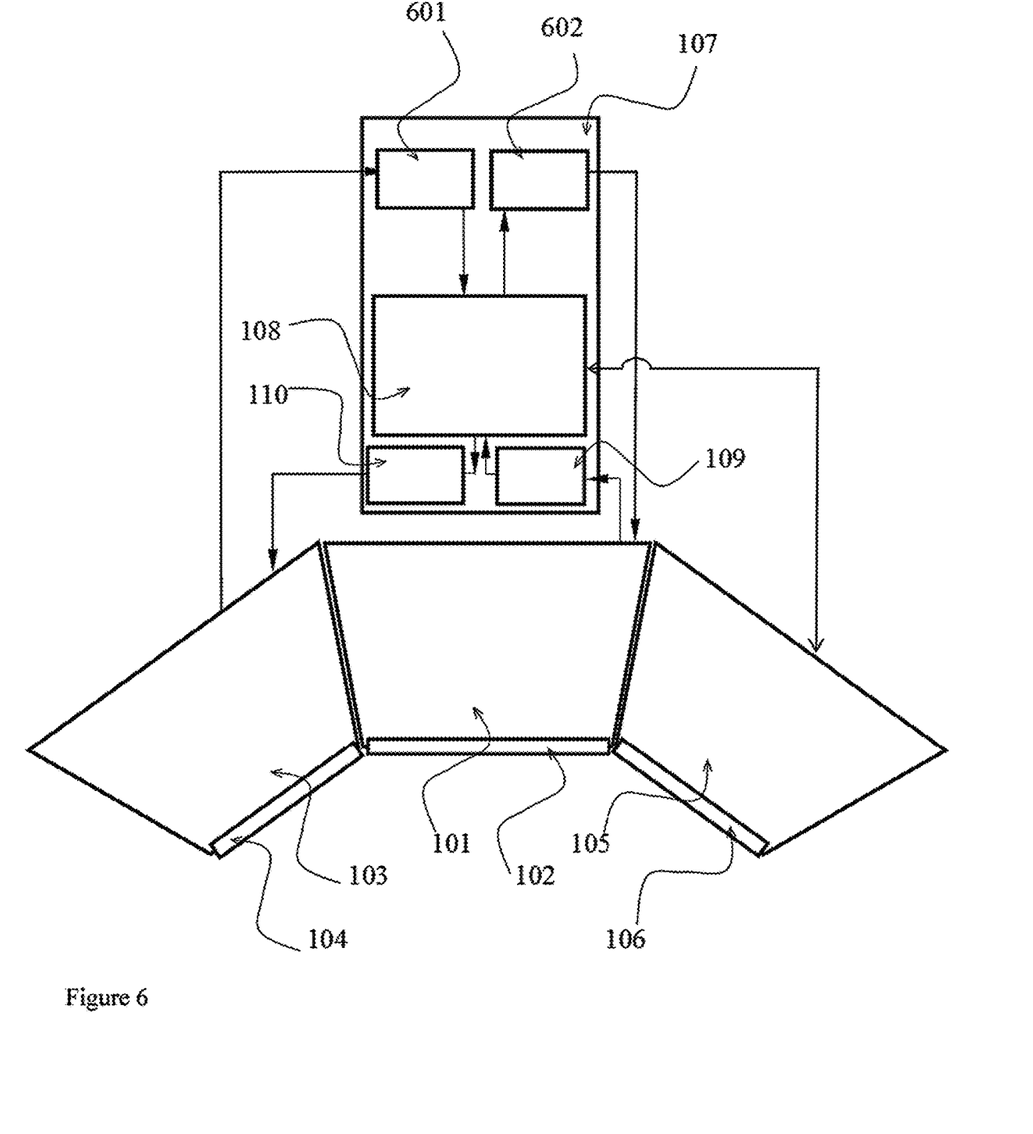
FIG. 6 shows the schematic diagram of the secured computer system in the simplified embodiment with exclusively linear physical unidirectional interfaces.

The disclosed method and apparatuses imply neither the strictly defined general system architecture, nor strictly limited assortment of unidirectional interfaces. As examples, FIG. 6 shows the schematic diagram of the secured computer system in the simplified embodiment with exclusively linear physically unidirectional interfaces, wherein 601 is linear physically unidirectional interface providing dataflow from web computer to lock computer; 602 linear physically unidirectional interface providing dataflow from lock computer to main computer.

Figure 7:
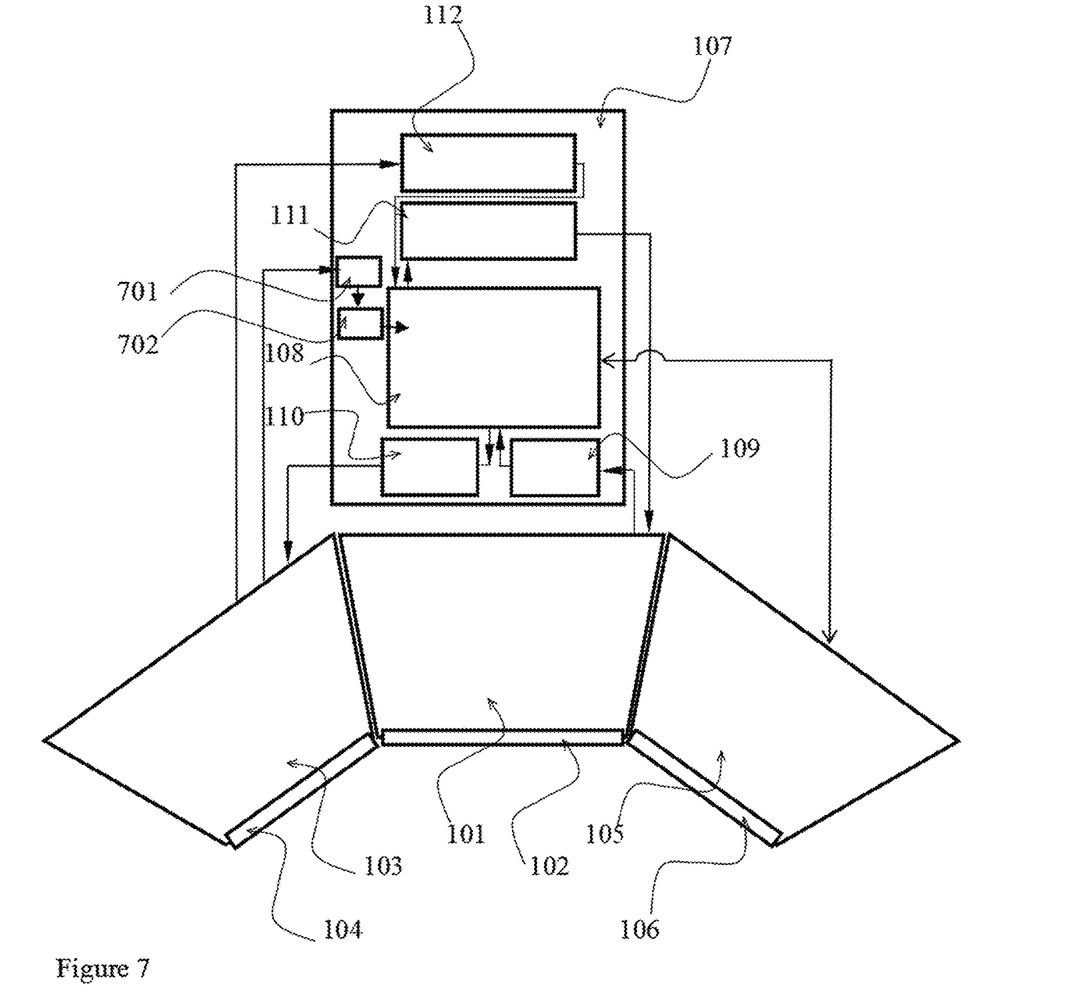
FIG. 7 shows the schematic diagram of the secured computer system in the complex embodiment comprising (besides on the interfaces shown on FIG. 1) electrical-to-acoustic and acoustic-to-electrical physically unidirectional interfaces.

Contrarily, FIG. 7 shows the schematic diagram of the secured computer system in the complex embodiment comprising (besides on the interfaces shown on FIG. 1) electrical-to-acoustic and acoustic-to-electrical physically unidirectional interfaces, wherein 701 and 702 physically unidirectional electrical-to-acoustic and acoustic-to-electrical interfaces providing dataflow from web computer to lock computer. While even in the simplified embodiment shown on FIG. 6, the present invention provides significantly stronger protection of the main computer from external attacks. The complex embodiment shown on FIG. 7 separates the sound dataflow, such as speech, music etc. from symbolic and imaging dataflow, thus providing especially strong protection of the system as well as the higher effectiveness of its functionality.

Another embodiment of present invention is that both said web-connected computer and said intermediate lock-computer never stores any private data except of data provided by said main computer for a current session of interaction with the world wide web.

Also in the preferable embodiment of the present invention the image is analyzed and its components classified by AI (Artificial Intellect) software devices known by the prior art, including text recognition, symbolic files recognition, program recognition and image recognition, and said AI filters out the compact program files attached or incorporated in the proper textual, symbolical or image files.

Although a personal computer designated to a single owner represents the primary embodiment of this disclosure, this does not preclude the network arrangements wherein a plurality of individual users share the common lock-computer and web-connected computer in parallel and/or based on time separation.

The disclosed method and apparatuses do not limit the number of computers assembled into the system and also imply the embodiments with reconfigurable architecture allowing reversible mutual transforming between various structural arrangements of the multi-computer system, actualization of various schemes of data exchange and therefore adapting said system for the employed IT, specific tasks and users' demands while preserving the key safety principles as disclosed above.

Effectively, the disclosed methods and apparatuses provide five levels of computer defense comprising one level known by the prior art and four principally new levels of defense:

1. physical separation of incoming dataflow and outgoing dataflow provides protection of the main computer with the reliability of the laws of physics during the sending information to world wide web;
2. Two-dimensional, 2D, interface between the web-connected computer and the lock computer transmits the dataflow from world wide web filtered from unwanted software automatically and more reliably than it can be achieved using the protective means known by the prior art;
3. the disclosed particularity of the lock computer prevents any possibility of attacks by the unwanted software, which could be remained latent after the prior sessions.
4. Two-dimensional, 2D, interface between the lock computer and the main computer transmits to the main computer the dataflow already twice filtered from unwanted software—each time more reliably than it may achieved using the protective means known by the prior art.

The disclosed methods, apparatuses and complex system architecture may decrease the maximal performance neither of the interactive communication with the world wide web while the web-connected computer is temporally designated exclusively for a specific task, nor of the Main computer while it is employed in the autonomous mode, nor of the knowledge base computer while it is employed being insulated from other components of the system.

The novel methods and apparatuses reinforcing security of a personal computer during its interaction with the world wide web and providing a principally higher safety than any other any method known by the prior art, while differently from the prior art said new level of security is provided while inserting any sensitive private information neither into hardware nor into software subsystems working online. Thus, one of the crucially important features of the disclosed Secured Computer System is the absolute detachment of its functionality from any private data; neither private business or personal information, nor biometric data of the user is required, and hence—they are never sacrificed for the purpose of securing functionality.

It is important to note that while the disclosed methods, apparatuses and computer architecture imply a higher general system complexity, the fast progress of technology will eventually integrate all subsystems, thus absorbing such a complexity in the production process, simplifying the final assembly and reducing the final price of the end product. This is followed from the steady basic trends of computer and computers' chips industries, as it was quantitatively shown in specific details three decades ago ([2-4], here incorporated for reference) and proved by the following development of semiconductor and computer technologies. It is reasonable to assume that after successful practical realization of this disclosure the suggested architecture will become a standard in the computers' and computer elements' industries.

In particular, the disclosed Transputer architecture and actualizing this architecture apparatuses will be eventually completely integrated in a monolithic device thus becoming a basic component of the system processing the complex information flows, processing and exchange as Transistor had become a basic component for processing of the singular electronic signals.

Initially, the disclosed architecture of Secured Computer System will increase the production cost and correspondingly the initial sale price of the computers; however, due to minimized required functionality of web-connected computer and lock computer, this increase would be not exceedingly high for the high-end computers on the market, and at the given highest level of security should be affordable for the majority of the high-end consumers. With the progress of the electronic technology, the price will decrease with fast pace becoming affordable for the majority of the entire market.

It would be also worth to note: although the present patent disclosure was not directly prompted by the natural principles of interaction of the human brain with the outside world, it does corresponds to these principles, namely: in the natural conditions, brain receives external information only through physically unidirectional sensory organs (primarily optical, acoustic, thermal, smell) and send information to the external world only by physically unidirectional means (primarily, acoustic and visible symbolic message). Thus, the disclosed principles, architecture and apparatuses corresponds to both practical trends of computer technology and its principal tendency directed to the structure of a brain.

Furthermore, the neurons in the natural neural networks of humans and animals are interconnected exclusively by physically unidirectional interfaces (synapses) while sending signal only through axons and receiving them only through dendrites. This arrangement secures exceptional reliability of the natural neural networks during entire life of humans and animals. Correspondingly, the disclosed architecture of Secured Computer System with physically unidirectional interfaces may be employed in the artificial neural networks wherein the entire disclosed architecture of Secured Computer System or its part, especially Transputer, may be encompassed by at least one, but preferably by every single element (electronic "neuron") of the artificial neural networks comprises Transputer with the linear unidirectional interfaces.

OTHER CITED REFERENCES

[2]. V. F. Dorfman, L. I. Ivanov, Optimized Development of Electronic Elements and Computer Hardware, "Znanie", Moscow, 1986 (in Russian).

[3]. V. F. Dorfman, L. V. Ivanov. Computer and its Elements: Development and Optimization, "Radio & Communications", Moscow. 1988 (in Russian).

[4]. Problems of the Systems Technology of Computers. J. New Gen. Computer Systems 2(1989), 1, 3-23. Berlin (short English version as invited article)

Practical Verification of the Disclosed Concept

The disclosed Secured Computer System has been tested employing a partially simulated Transputer subsystem. The basic system was assembled of the web-connected computer, the lock-computer, the main computer and mass storage of data knowledge base accordingly to FIG. 1, but the physically unidirectional interfaces had been simulated by the human-controlled interfaces: a human (inventor) controlled the data exchange accordingly to dataflow shown on FIG. 5.

Both the web-connected computer and the main computer were fully loaded with standard programs, while the lock-computer was loaded only with utmost minimum programs required for its operation accordingly to disclosure. Multiple security programs had been loaded to web-connected and to the lock-computer, including Norton™, Viper™, Webroot™, and others, of which one was employed as active security software while the web-connected computer worked online, and others for additional scanning offline. All security programs loaded to computers from the purchased CD (with the only exclusion described below). With some difference from disclosure, the lock computer was temporally and shortly connected to WWW to activate the security programs. With another slight difference from disclosure, the lock computer was reformatted weekly, but not after every session because this computer carries system software on magnetic hard disk, and during every reformatting system software was reloaded anew, that requires substantial time. The main computer was loaded only with scanning security programs which do not require activation online.

During the three years of test, most extensive work online was in various professional technical and academic research fields including publications of research articles and corresponding online exchange with publishers, web publications, patent submission to USPTO and patent research, for research and reading professional academic and industrial publications, as well as for business email exchange; in a smaller scale, the system was employed for online shops and private email, and also for reading of general news on standard recognized sites. Generally, the social media was not included in the tests, however during a limited time of a few months periods for testing purpose the exclusion was made for FaceBook and LinkedIn. A substantial limitation of the test was in that that most dangerous sites, such as erotic, political "leaks" etc., never tested.

During said three years of test, the web-connected computer was subject of numerous scam attacks, especially following the online publications. The dangerous mass attacks by scammers and hackers occurred only once following the purchase and loading online certain security software. However, penetration of any damaging or scamming software into the lock computer, and hence—to the main computer never occurred.

The disclosed Secured Computer System has been also tested employing a partially simulated Transputer subsystem as described in pp. [56]-[58] with fiber—optical Internet cable provider Sonic™ (trade mark and the Company name) [https://www.Sonic.com]. The optical interconnections bring Internet on new levels of both speed of communication and security of transmission while the prior art providing security of a personal computer during its interaction with the world-wide web is based on and designated for electrical transmission systems only. The novel Secured Computer System described in the present patent disclosure would serve a perfect match to optical interconnections. The preliminary one-year long test supports such anticipation.

Figure 8:
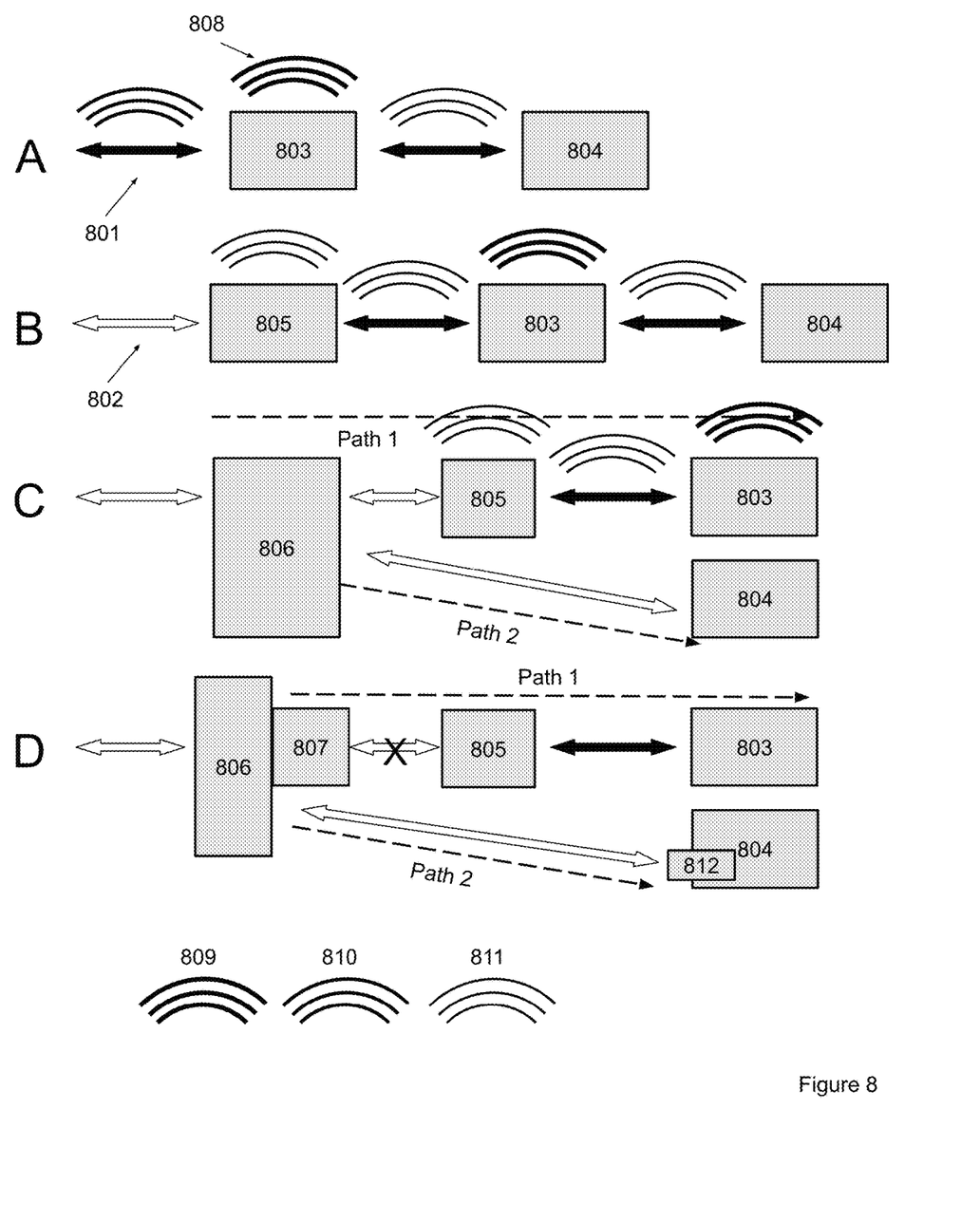
FIG. 8 shows five diagrams of secured interaction of Lock-computer with the internet.

FIG. 8 contains four diagrams of a computer's interaction with the internet. Diagrams A and B are the conventional systems for which most computers are connected to the internet. Diagram A shows an electrical cable being routed to the modem and then connected to the computer. The problem with this method is that it generates strong radio frequency energy meaning this system is vulnerable to radio frequency attacks. Diagram B is similar to A except the incoming data originates from an optical cable which emits no RF energy, however the optical cable is channeled into an electro-optical transducer which then translates the data into an electrical signal to then be passed to the modem and computer. Because the data from the optical cable is converted to an electrical cable as it enters the system, the system still emits significant amounts of RF energy. Diagram C starts with a light beam splitter which splits the incoming signal into two different paths. The first path is exactly like diagram B where the optical cable is run through an electro-optical transducer and then to a modem. The second path routes data from the splitter directly to the computer via optical cables, thus emitting no RF energy. The problem with this diagram is that the data sent to the computer is also being sent to the modem which still emits RF energy. Diagram D details a system where the incoming optical cable is put through a light beam splitter which splits into two paths. The first path has the data going through a Lock-computer which blocks all data from reaching the electro-optical transducer and the modem. The second path routes data from the splitter directly to a electro-optical transducer near or within the computer via optical cables. Because the first path blocks the data from reaching the optical-electro transducer connected to the modem, that path emits no RF energy. And the second path only emits RF energy as the data reaches the computer, meaning that this system has significantly RF energy than the methods commonly used today like Diagram A and B.

Figure 9:
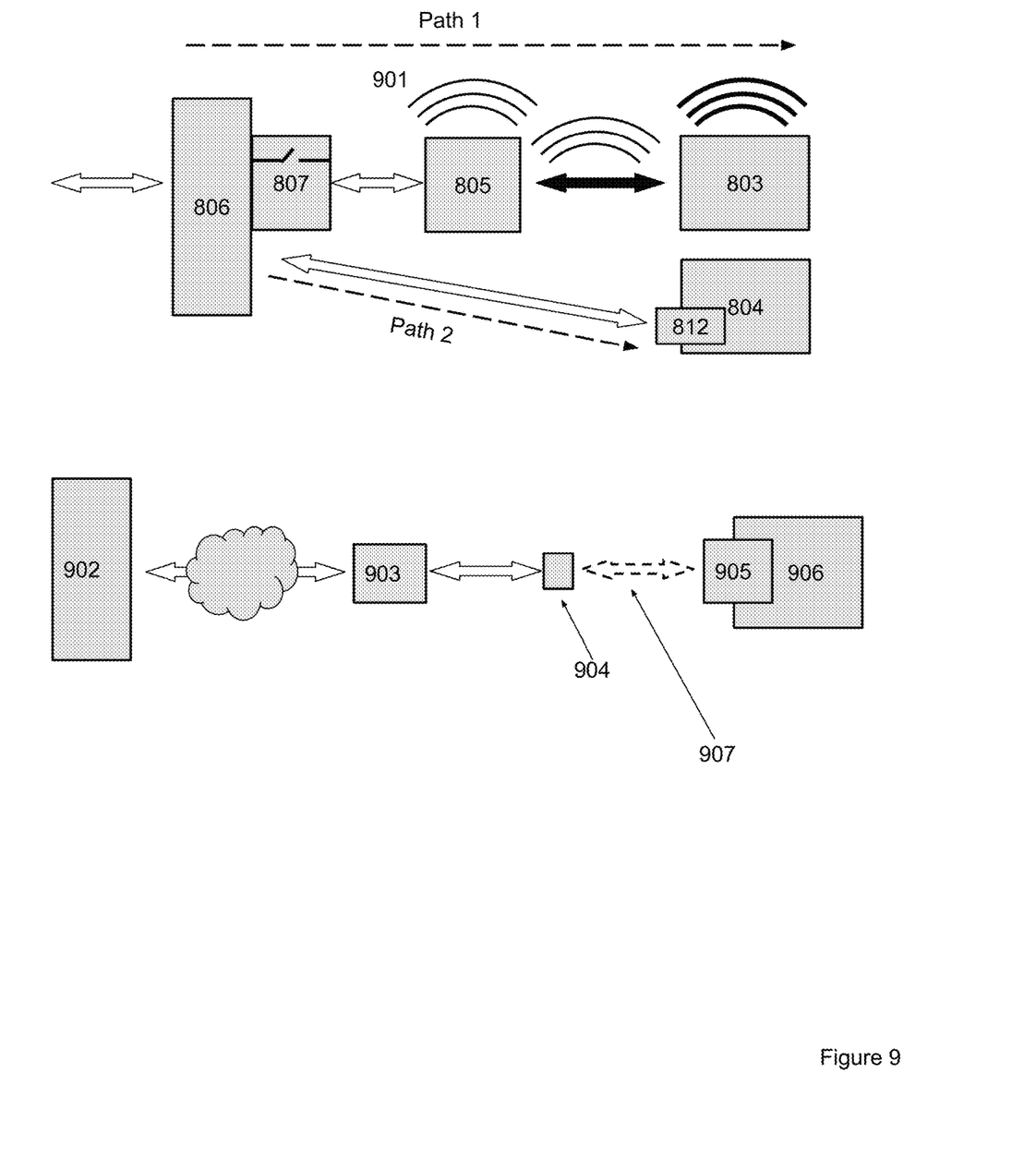
FIG. 9 shows an additional two diagrams the first one allows an optical signal to flow through directly to the computer, and 901 a physical switch that connects the light beam splitter to the optical to electrical transducer and modem. The second diagram shows an application of new LiFi technology to securely transmit data through light. The second diagram includes a server (902), a converter (903), an LED light transmitter (904), a LED light receptor (905), a main computer (906), and a dashed double arrow representing a LiFi connection (907).

FIG. 9 combines the security of Diagram D with the wireless capabilities of Diagram C. FIG. 9 utilizes a light beam splitter to split the incoming data into two different paths. The first path is run through a Lock-computer which has a physical switch that connects to a electro-optical transducer which connects to the modem. The physical switch can be toggled on or off depending on whether a wireless connection is needed by the user. The second path is not affected by the switch and provides a constant connection between the computer and the internet via optical cables. This method is the best of both worlds, meaning that this system allows for secure internet access while the first path is toggled off by the switch, and it allows for multiple devices to be wirelessly connected to the network when the first path is toggled on. An alternative to optical signals would be to use a new technology called Li-Fi (Light Fidelity) where data transfer is routed through LED lights instead of optical or electrical cables. Li-Fi is a more secure option for data transfer because it doesn't emit any radio waves, and it only transfers data through lights so the data cannot travel through walls and doors. This is applied the the second diagram in FIG. 9 in which the server (902) will transmit data through optical signals to a converter (903) which converts the optical signal to a light signal which is run through and LED light transmitter (904) which will flash on and off rapidly enough to transmit a large amount creating a LiFi connection (907) which is received by a LED light receptor attached to a main computer (905) which will convert the light data into electrical signals. The effect of this diagram is to keep a secure signal that doesn't omit any RF energy until it reaches the main computer itself.

The invention claimed is:

1. A computer system comprising:
   an electro-optical transducer integrated into a web-connected computer or directly connected thereto;
   a light beam splitter configured to split a beam of light encoding data communicated over a public computer network into at least a first optical communication path and a second optical communication path;
   a lock computer along the first optical communication path, the second optical communication path formed along an optical-fiber cable configured to terminate at the optical-electrical transducer of the web-connected computer, the lock computer including a controllable switch configured to allow or disallow the data to be communicated along the first optical communication path between the light beam splitter and a modem downstream of the light beam splitter;
   a second electro-optical transducer configured to be operably connected to the modem to convert the data in response to the controllable switch being configured to allow the data to be communicated, the controllable switch being controlled by the lock computer; and
   a main computer coupled to the web-connected computer via the lock computer such that direct and counter dataflows between the main computer and the web-connected computer are unconditionally physically separated by two physically separated unidirectional interfaces, wherein one of the two unidirectional interfaces is configured to provide a direct dataflow exclusively from the web-connected computer to the main computer, and wherein the other of the two unidirectional interfaces is configured to provide a counter dataflow exclusively from the main computer to the web-connected computer, the lock computer including:
   a core computer;
   the output transducer of the unidirectional interface providing unidirectional data flow from the lock computer to the main computer;
   the input transducer of the unidirectional interface providing unidirectional data flow from the main computer to the lock computer;
   the output transducer of said unidirectional interface providing unidirectional data flow from said lock computer to the web-connected computer; and
   the input transducer of the unidirectional interface providing unidirectional data flow from web connected computer to the lock computer.

2. The computer system of claim 1, wherein the second optical communication path is provided to a LED light transmitter, which transmits the data over a wireless light fidelity (LiFi) network, to a corresponding LED light receptor, which is operatively coupled to a second main computer.

3. The computer system of claim 1, further comprising an intermediate lock-computer, wherein any pair of computers of the computer system except the lock-computer is configured to interact only through the intermediate lock-computer.

4. The computer system of claim 3, wherein the intermediate lock-computer comprises:
   a core computer;
   the output transducer of the unidirectional interface providing unidirectional data flow from the lock-computer to the main computer;
   the input transducer of the unidirectional interface providing unidirectional data flow from the main computer to the lock-computer;
   the output transducer of the unidirectional interface providing unidirectional data flow from the lock-computer to the web-connected computer;
   the input transducer of the unidirectional interface providing unidirectional data flow from web-connected computer to the lock-computer.

5. The computer system of claim 4, wherein the lock-computer comprises:
   a core computer having built-in unchangeable and immutable system software that is not modifiable by any downloaded program and is configured to be updated only by replacement of a tangible hardware component on which the system software is stored.

6. The computer system of claim 1, wherein one of the unidirectional interfaces includes a unidirectional electrical-to-acoustic transducer and the other of the unidirectional interfaces includes a unidirectional acoustic-to-electrical transducer.

* * * * *